(12) United States Patent
Chaniot

(10) Patent No.: US 7,819,359 B2
(45) Date of Patent: Oct. 26, 2010

(54) AIRCRAFT FIREWALL

(75) Inventor: Daniel Chaniot, Marignane (FR)

(73) Assignee: Eurocopter, Marignane (FR)

( * ) Notice: Subject to any disclaimer, the term of this patent is extended or adjusted under 35 U.S.C. 154(b) by 602 days.

(21) Appl. No.: 11/896,812

(22) Filed: Sep. 6, 2007

(65) Prior Publication Data
US 2009/0134276 A1 May 28, 2009

(30) Foreign Application Priority Data
Sep. 6, 2006 (FR) .................................. 06 07813

(51) Int. Cl.
*B64C 1/40* (2006.01)
(52) U.S. Cl. ...................................................... 244/121
(58) Field of Classification Search ................. 244/121, 244/17.11, 53 R, 57
See application file for complete search history.

(56) References Cited

U.S. PATENT DOCUMENTS 2,986,878 A * 6/1961 Townsend .................. 60/39.11
4,177,693 A * 12/1979 Ivanko et al. ................. 74/661
4,291,530 A * 9/1981 Ballard ..................... 60/39.092
7,090,165 B2 8/2006 Jones et al.
2004/0093850 A1 5/2004 Horii et al.

FOREIGN PATENT DOCUMENTS

| EP | 0 893 589 A2 | 1/1999 |
|---|---|---|
| FR | 1 150 590 A | 1/1958 |
| FR | 2 855 497 A | 12/2004 |
| GB | 1 212 109 A | 11/1970 |
| GB | 2 317 825 A | 4/1998 |
| WO | 03/033345 A2 | 4/2003 |

* cited by examiner

*Primary Examiner*—Tien Dinh
(74) *Attorney, Agent, or Firm*—Young & Thompson

(57) ABSTRACT

The present invention relates to an aircraft firewall (12) separating first and second compartments (1 and 2) of the aircraft, the first compartment (1) containing a plurality of elements. The firewall (12) is provided with a first wall (3) inserted in the structure (5) of the aircraft and having a first surface (3') facing the first compartment (1), and the firewall (12) is provided with regulator elements (4, 13) for maintaining the maximum temperature of the first surface (3') of the first wall (3) at a predetermined temperature value lower than the self-combustion temperature of the elements.

14 Claims, 1 Drawing Sheet

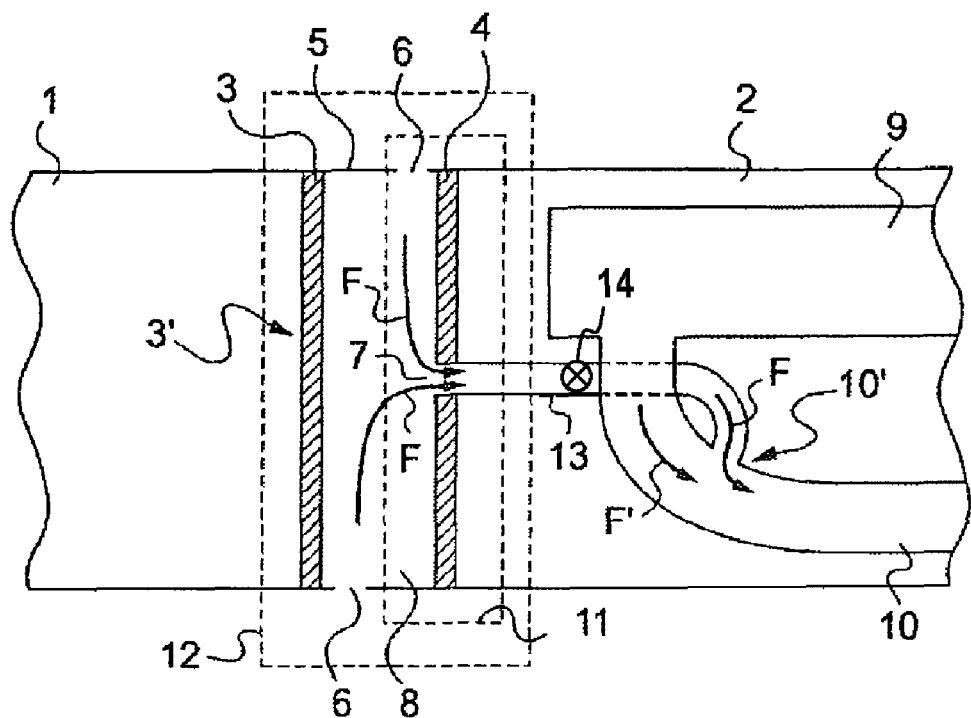
Sole figure

AIRCRAFT FIREWALL

The present invention relates to a firewall for an aircraft, and more particularly for a rotorcraft.

BACKGROUND OF THE INVENTION

A rotorcraft has at least one turboshaft engine that acts via a main transmission gearbox to transmit power to a rotor for providing lift and possibly also propulsion. The main gearbox and the engine are housed respectively in first and second compartments, and a firewall is generally arranged in the structure of the rotorcraft to separate the first and second compartments. Thus, if the engine accidentally catches fire the second compartment, the fire will not normally propagate into the first compartment containing the main gearbox.

In the known prior art, a firewall is constituted by a metal wall made of steel or titanium, for example, in order to prevent fire propagating.

In normal operation, the cold surface of the firewall facing the main gearbox reaches temperatures either of about 180° C. maximum when the gas exhaust nozzle of the engine is remote from the main gearbox, or else lying in the range 300° C. to 400° C. when the gas exhaust nozzle of the engine lies beside the main gearbox.

The rotorcraft certification standards that are applicable in particular to the mechanical compartment containing the main gearbox being particularly severe, the risk of fire in that mechanical compartment must be minimized to the greatest possible extent.

OBJECTS AND SUMMARY OF THE INVENTION

The present invention thus seeks to provide an aircraft firewall that makes it possible in particular to prevent fire forming in a sensitive mechanical compartment, for example the compartment containing the main gearbox of a rotorcraft.

According to the invention, an aircraft firewall separates first and second compartments of the aircraft, the first compartment containing a plurality of elements. The firewall is remarkable in that this firewall is provided with a first wall inserted in the structure of the aircraft and having a first surface facing said first compartment, and is provided with regulator means for maintaining the maximum temperature of said first surface of the first wall at a predetermined temperature value lower than the self-combustion temperature of said elements contained in the first compartment.

When the aircraft is a rotorcraft, a power transmission gearbox is advantageously arranged in the first compartment, with a turboshaft engine then being disposed in the second compartment.

The firewall is thus normally provided with a first wall, e.g. made of metal, for preventing a fire that might start in the second compartment from propagating into the first compartment.

In addition, the Applicant has discovered, surprisingly, that a high wall temperature for the firewall is liable to start a fire. It is conceivable that the firewall reaches high temperatures of the order of 400° C. in the above-described example. If one of the elements has a self-combustion temperature lower than the temperature of the firewall, there is a risk of that element lighting. If a main gearbox is arranged in the first compartment, an oil leak can lead to oil being projected against the firewall and can therefore lead to a fire being formed.

According to the invention, the firewall is provided with regulator means for maintaining the first surface of the first wall at a temperature that is lower than the self-combustion temperature of the elements in the first compartment, e.g. oil, which temperature advantageously lies in the range 300° C. to 310° C. on a continuous basis.

This firewall thus acts in a novel manner to prevent fire from propagating from one aircraft compartment to the other, and also prevents fire from forming as a result of contact between an element in the first compartment and the firewall.

In a first embodiment, the regulator means comprises thermal protection for the first wall in order to maintain its first surface at the required temperature.

In a second embodiment, the regulator means comprises a second wall inserted in the structure of the aircraft in such a manner that said first and second walls are respectively beside the first and second compartments, said second wall optionally including thermal protection. It will readily be understood that both embodiments can be applied together.

The firewall thus possesses first and second walls inserted in the structure of the aircraft between the first and second compartments, the first and second walls of the firewall defining an internal space. The first wall is separated from the second compartment by the second wall and by said space, so that the temperature of its first surface is lower.

In addition, and advantageously, the internal space defined by the first and second walls of the firewall has a stream of cool air passing therethrough, said stream of cool air penetrating into said internal space via at least one inlet orifice and exiting via at least one outlet orifice so that said firewall is ventilated. This ventilation cools the temperature of the first surface of the first wall. To optimize the device, the stream of cool air comes from the surrounding air situated outside the aircraft, said air being at a temperature that enables the firewall to be cooled.

In a variant of the invention, the inlet orifice is made through the structure of the aircraft lying between the first and second walls of the firewall.

In another variant, that can be used in association with the preceding variant, the outlet orifice is made through one of the first and second walls of said firewall. More particularly, the second compartment contains an engine, and the outlet orifice is made through the second wall situated beside the second compartment.

Furthermore, in order to provide ventilation, the stream of cool air flows through the internal space of the firewall by being sucked in by suction means forming part of the regulator means.

Advantageously, the firewall is provided with an outlet orifice and the suction means comprise a duct connecting the outlet orifice to a gas exhaust nozzle of an engine of the aircraft, the gas exhaust creating a depression suitable for sucking in the stream of cool air.

In a variant of the invention where said nozzle has a bend, the duct opens out into a bend of said nozzle.

Finally, in another variant, the duct includes a check valve to prevent any fluid from flowing from the exhaust nozzle towards the firewall.

BRIEF DESCRIPTION OF THE DRAWING

The invention and its advantages appear in greater detail from the following description showing preferred embodiments and given without any limiting character, and with reference to the sole accompanying FIGURE.

The sole FIGURE shows first and second compartments 1 and 2 of an aircraft, such as a rotorcraft, for example.

MORE DETAILED DESCRIPTION

The first compartment 1 contains a plurality of elements. When the aircraft is a rotorcraft, these elements may be the various components of a power transmission gearbox, with a turboshaft engine 9 then being arranged in the second compartment 2.

In addition, said aircraft includes a firewall 12 separating the first and second compartments 1 and 2 firstly to prevent fire propagating from one compartment to the other, and secondly to prevent fire starting in the first compartment 1.

The firewall then comprises a first wall 3 inserted in the structure 5 of the aircraft, having a first surface 3' facing the first compartment 1, i.e. inside said first compartment 1.

In order to perform its functions, the firewall 12 is provided with regulator means 11 for maintaining the temperature of the first surface 3' at a temperature that does not reach the self-combustion temperature of elements to be found in the first compartment.

Thus, the first wall 3 prevents a fire from propagating from one compartment to the other, and the regulator means limit the maximum temperature that can be reached by the first surface 3' of said wall 3, preferably to a temperature lying in the range 300° C. to 310° C. As a result, the firewall 12 eliminates a major risk of fire in the first compartment, thus enabling the aircraft manufacturer to minimize fire risk. If the flight controls pass through said first compartment, it is then possible to envisage making them out of aluminum instead of steel or titanium, thereby considerably reducing the weight of the aircraft.

In a first embodiment (not shown in the FIGURE), the regulator means comprises thermal protection for the first wall 3, a thermally insulating material being secured to the first wall 3, for example.

In a second embodiment as shown in the sole FIGURE, the regulator means 11 of the firewall 12 are provided with a second wall 4. The second wall 4 is then inserted in the structure 5 of the aircraft in such a manner that the first and second walls 3 and 4 define between them an internal space 8.

The aircraft then comprises in succession a first compartment 1, a first wall 3 of the firewall 12, said internal space 8, the second wall 4 of the firewall 12, and then the second compartment 2.

It will be understood that like the first embodiment, the first wall 3 and/or the second wall 4 is provided with thermal protection.

The internal space 8 thus thermally insulates the firewall so as to maintain the first surface 3' at a temperature lower than the lowest self-combustion temperature of the elements placed in the first compartment 1, even if the gas exhaust nozzle 10 from an engine 9 is close to the second wall 4 of the firewall 12.

Consequently, the first wall 3 does not run the risk of starting a fire by lighting an element of the first compartment 1, e.g. oil.

To optimize cooling of the first surface 3' of the first wall 3, the internal space 10 has a stream of cool air passing therethrough following arrows F.

This stream of cool air thus penetrates into the internal space 8 via at least one inlet orifice 6. Specifically, inlet orifices are made in the structure 5 of the aircraft between the first and second walls 3 and 4 as shown in the sole FIGURE. The stream of cool air then leaves the internal space 8 via at least one outlet orifice 7, made in a variant of the invention through one of the first and second walls 3 and 4, and more particularly through the second wall 4, as shown in the sole FIGURE.

The stream of cool air thus establishes ventilation that significantly improves the effectiveness of the device, particularly if the stream of air is taken from outside the aircraft. Said ventilation is then made easier when the regulator means 11 further include means for sucking in the stream of cool air.

The suction means may be conventional means such as a pump, for example. Nevertheless, in order to limit the weight of the device and also to facilitate extracting the stream of cool air, the suction means of the regulator means 11 comprise a duct 13 connecting the outlet orifice 7 to the gas exhaust nozzle 10 from the engine 9. The duct 13 may include a check valve 14.

Consequently, the exhaust of gas along arrow F' creates a pressure drop that serves to suck in the stream of cool air.

In addition, if the nozzle has a bend, as is often the case given the space available, the duct 13 is connected to the inside of the bend 10' in the nozzle 10.

Furthermore, it should be observed that the bends 10' in nozzles 10 are generally very sharp in this architecture, with the consequence that the gas streamlines separate from the inside of the bend 10'. Such separation is harmful since it leads to losses of head and to a consequent reduction in the power delivered by the engine 9.

Reinjecting air into the inside of the bend 10' of the nozzle 10 thus serves to improve significantly the flow of gas in said zone, thereby increasing the power delivered by the engine.

Naturally, numerous variant implementations of the present invention are possible. Although several embodiments are described above, it will readily be understood that it is not possible to identify exhaustively all possible embodiments. It is naturally possible to envisage replacing any of the means described by equivalent means without going beyond the ambit of the present invention.

What is claimed is:

1. An aircraft firewall (12) separating first and second compartments (1 and 2) of said aircraft, said first compartment (1) containing a plurality of elements, the firewall (12) being provided with a first wall (3) inserted in a structure (5) of the aircraft and having a first surface (3') facing said first compartment (1), and is provided with regulator means (4, 13) for maintaining a maximum temperature of said first surface (3') of the first wall (3) at a predetermined temperature value lower than a self-combustion temperature of said elements, wherein said aircraft is a rotorcraft, a power transmission gearbox being arranged in said first compartment (1), and a turboshaft engine (9) being disposed in said second compartment (2).

2. The firewall according to claim 1, wherein said maximum temperature lies in the range 300° C. to 310° C., on a continuous basis.

3. The firewall according to claim 1, wherein said regulator means include thermal protection for said first wall (3).

4. The firewall according to claim 1, wherein said regulator means include a second wall (4) inserted in the structure (5) of the aircraft so that said first and second walls (3 and 4) are respectively beside the first and second compartments (1 and 2).

5. The firewall according to claim 4, wherein said regulator means include thermal protection for said second wall (2).

6. An aircraft firewall (12) separating first and second compartments (1 and 2) of said aircraft, said first compartment (1) containing a plurality of elements, the firewall (12) being provided with a first wall (3) inserted in a structure (5) of the aircraft and having a first surface (3') facing said first compartment (1), and is provided with a regulator (4, 13) for maintaining a maximum temperature of said first surface (3')

of the first wall (3) at a predetermined temperature value lower than a self-combustion temperature of said elements, wherein said regulator comprises a second wall (4) inserted in the structure (5) of the aircraft in such a manner that said first and second walls (3 and 4) are respectively beside the first and second compartments (1 and 2), said first and second walls (3 and 4) of the firewall defining an internal space (8) for passing a stream of cool air (F), said stream of cool air (F) penetrating into said internal space (8) via at least one inlet orifice (6) and exiting via at least one outlet orifice (7) so that said firewall (12) is ventilated.

7. The firewall according to claim 6, wherein said stream (F) of cool air comes from the surrounding air situated outside said aircraft.

8. The firewall according to claim 6, wherein said inlet orifice (6) is made in the structure (5) of the aircraft between said first and second walls (3 and 4) of the firewall (12).

9. The firewall according to claim 6, wherein said outlet orifice (7) is made in one of the first and second walls (3 and 4) of said firewall.

10. The firewall according to claim 6, wherein said second compartment (2) contains an engine (9) and said outlet orifice (7) is made through said second wall (4) situated beside the second compartment (2).

11. The firewall according to claim 6, wherein said stream (F) of cool air flows in said internal space (8) of said firewall (12) by being sucked into suction means of the regulator means.

12. The firewall according to claim 11, said suction means comprising a duct (13) connecting said outlet orifice (7) to a gas exhaust nozzle (10) of an engine (9) of the aircraft, the exhaust stream (F') of said gas creating a depression suitable for sucking in said stream (F) of fresh air.

13. The firewall according to claim 12, wherein said nozzle (10) has a bend, and said duct opens out into a bend (10') of the nozzle (10).

14. The firewall according to claim 12, wherein said duct (13) includes a check valve (14) preventing fluids from flowing from the exhaust nozzle towards the firewall.

\* \* \* \* \*